United States Patent
MacLellan et al.

(10) Patent No.: US 8,183,712 B2
(45) Date of Patent: May 22, 2012

(54) METHOD AND SYSTEM FOR ORGANIZING AND OPTIMIZING ELECTRICITY CONSUMPTION

(75) Inventors: Scot MacLellan, Rome (IT); Valeria Perticara', Rome (IT)

(73) Assignee: International Business Machines Corporation, Armonk, NY (US)

( * ) Notice: Subject to any disclaimer, the term of this patent is extended or adjusted under 35 U.S.C. 154(b) by 334 days.

(21) Appl. No.: 12/208,197

(22) Filed: Sep. 10, 2008

(65) Prior Publication Data

US 2010/0060079 A1    Mar. 11, 2010

(51) Int. Cl.
*H02J 1/04* (2006.01)
*H02J 3/14* (2006.01)

(52) U.S. Cl. ............... 307/35; 307/38; 307/39; 702/65; 705/412

(58) Field of Classification Search .................. 307/36
See application file for complete search history.

(56) References Cited

U.S. PATENT DOCUMENTS

| | | | |
|---|---|---|---|
| 5,430,430 A | | 7/1995 | Gilbert |
| 6,016,478 A | * | 1/2000 | Zhang et al. ............... 705/9 |
| 6,493,643 B1 | | 12/2002 | Aisa |
| 6,658,303 B2 | * | 12/2003 | Hatemata et al. .......... 700/14 |
| 7,181,293 B2 | | 2/2007 | Rothman et al. |
| 2002/0194048 A1 | * | 12/2002 | Levinson ..................... 705/9 |
| 2003/0233201 A1 | | 12/2003 | Horst et al. |
| 2004/0075343 A1 | * | 4/2004 | Wareham et al. .......... 307/39 |
| 2006/0112286 A1 | * | 5/2006 | Whalley et al. ............ 713/300 |
| 2006/0276938 A1 | * | 12/2006 | Miller ........................ 700/295 |
| 2007/0084942 A1 | | 4/2007 | Moore et al. |
| 2010/0063644 A1 | * | 3/2010 | Kansal et al. .............. 700/295 |

* cited by examiner

*Primary Examiner* — Rexford N Barnie
*Assistant Examiner* — Justen Fauth
(74) *Attorney, Agent, or Firm* — DeLizio Gilliam, PLLC

(57) ABSTRACT

A method and system for managing power consumption by electrical appliances, is provided. One implementation involves obtaining power consumption information for a use cycle of a each of multiple appliances; and automatically scheduling a time slot for an operation cycle of a selected appliance as a function of power consumption by appliance cycles scheduled in that time slot, such that an upper limit of power consumption is not exceeded by the collective power consumption for scheduled appliance cycles in the time slot.

26 Claims, 5 Drawing Sheets

METHOD AND SYSTEM FOR ORGANIZING AND OPTIMIZING ELECTRICITY CONSUMPTION

BACKGROUND OF THE INVENTION

1. Field of the Invention

The present invention relates generally to controlling electricity consumption, and in particular, to managing electricity consumption in a residence.

2. Background Information

Domestic electrical appliances in a residence consume a certain quantity of electricity, and the usage of two or more appliances at the same time has a cumulative effect on the amount of electricity being consumed at that time. Many domestic contracts for electricity supply, stipulate an upper limit for the amount of electricity that can be consumed at any point in time, and if that limit is exceeded it is common practice for the electricity meter to interrupt the electricity supply. This can be, at best, annoying, and in many cases it can have a negative impact on domestic chores or habits. Conventional approaches to addressing interruption are reactive to the consumption reaching a maximum threshold, and switch off low priority appliances to prevent interruption of power to all devices. Even with such approaches in place, a residence is still prone to electricity disruption since certain appliances are turned off if a maximum threshold is reached.

SUMMARY OF THE INVENTION

The invention provides a method and system for organizing, managing and optimizing electrical consumption. One embodiment includes obtaining power consumption information for a use cycle of a each of multiple appliances; and automatically scheduling a time slot for an operation cycle of a selected appliance as a function of power consumption by appliance cycles scheduled in that time slot, such that an upper limit of power consumption is not exceeded by the collective power consumption for scheduled appliance cycles in the time slot.

Automatically scheduling a time slot for an operation cycle of a selected appliance may further include automatically scheduling a time slot for an operation cycle of the selected appliance as a function of: power consumption during an operation cycle of said selected appliance cycle, and power consumption during an operation cycle of each of other appliances scheduled for operation during that time slot, such that an upper limit of power consumption is not exceeded by the collective power consumption for scheduled appliance cycles in the time slot.

Obtaining power consumption information may include receiving power consumption information for a use cycle of each of multiple appliances from a user. Automatically scheduling a time slot for an operation cycle of a selected appliance may further include automatically scheduling a time slot for an operation cycle of a selected appliance as a function of: power consumption by appliance cycles scheduled in that time slot, and historical power consumption patterns of said appliances, such that an upper limit of power consumption is not exceeded by the collective power consumption for scheduled appliance cycles in the time slot.

The method may further include determining power consumption projections based on historical power consumption patterns of the appliances; and automatically rescheduling appliance cycles based on actual power consumption levels and power consumption projections for the appliances, such that an upper limit of power consumption is not exceeded by the collective power consumption for scheduled appliance cycles in each time slot.

The method may further include providing a user interface for receiving from a user an appliance selection and preferred operation time slot for the selected appliance, and automatically rescheduling appliance cycles as a function of power consumption by appliance cycles scheduled in that time slot, such that an upper limit of power consumption is not exceeded by the collective power consumption for scheduled appliance cycles in the time slot. If an appliance cycle is imposed for a time slot, then other appliance cycles in that time slot are rescheduled according to predefined schedule constraints and prioritization of appliance cycles.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the invention, as well as a preferred mode of use, reference should be made to the following detailed description read in conjunction with the accompanying drawings, in which.

DESCRIPTION OF THE PREFERRED EMBODIMENTS

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

The invention provides a method and system for organizing, managing and optimizing electrical consumption. One embodiment involves scheduling the operation of domestic electrical appliances through an interface that allows determining the most appropriate time for operating each appliance in a residence, without risk of exceeding the maximum permitted consumption for the residence. The interface is provided by an application that supports scheduling and organizing of appliance operations, and can automatically adjust domestic appliance operation schedule to react to new events or new scheduled activities.

Figure 1:
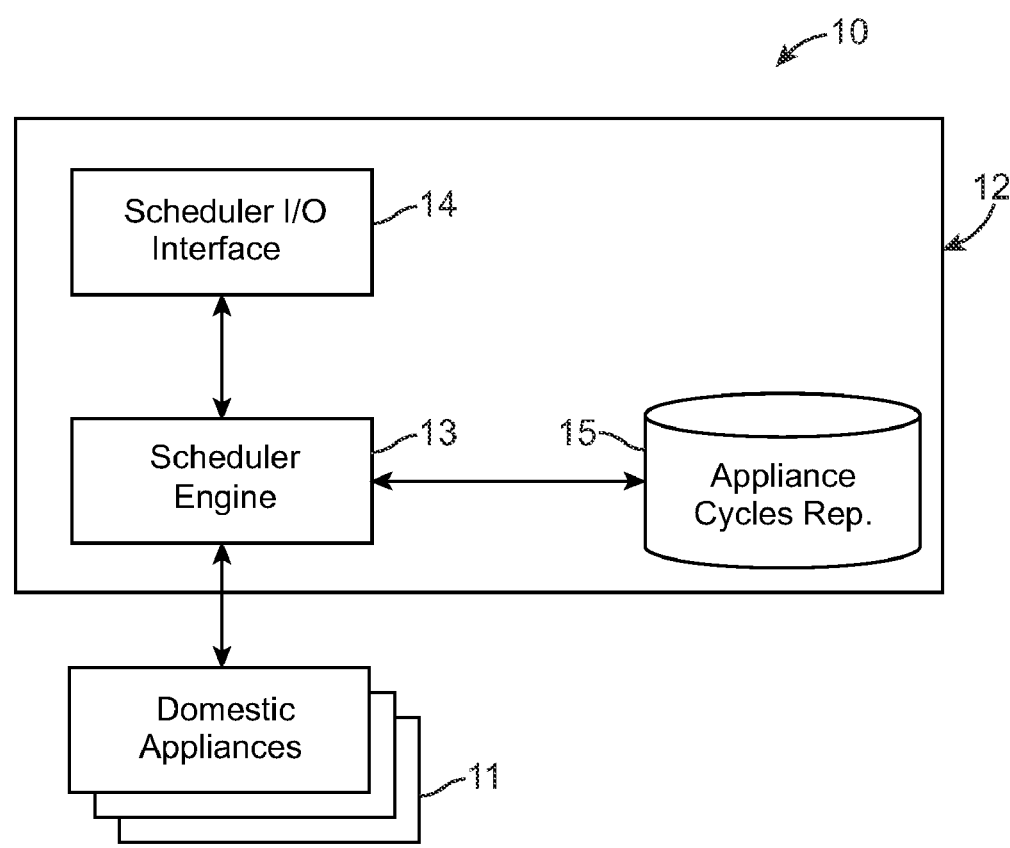
FIG. 1 shows a functional block diagram of a system implementing a method for organizing, managing and optimizing electrical consumption, according to an embodiment of the invention.

FIG. 1 shows a functional block diagram of a system 10 including multiple electrical appliances 11 and a scheduling system 12 running on a computing module, according to an embodiment of the invention. Example electrical appliances may include washing machine, dishwasher, oven, air conditioner, consumer electronics, etc. The scheduling system 12 includes a scheduler engine 13 that provides a scheduling application, an interface module 14 that generates said interface for scheduling appliance operations, and an appliance cycles repository 15.

The electricity consumption of each domestic appliance 11 is known (e.g., provided by the manufacturer, measured and maintained as historical information, etc.). The consumption of each appliance 11 need not be constant, but can vary at different points in its usage cycle. Some appliances can have different consumption patterns depending on manner of use (e.g., a washing machine supports different cycles with different consumption patterns), while others are constant (e.g., a 60 W light bulb always consumes 60 W). Consumption pattern of each appliance is maintained in the repository 15 as an appliance cycle.

Utilizing the interface module 14, a user may schedule a new appliance cycle, modify an existing appliance cycle schedule, add a new appliance cycle to the existing list in the repository 15, etc. The scheduler engine 13 manages operation schedules of the appliances, monitors their schedules to store historical data in the repository 15 and performs recovery actions.

Figure 2:
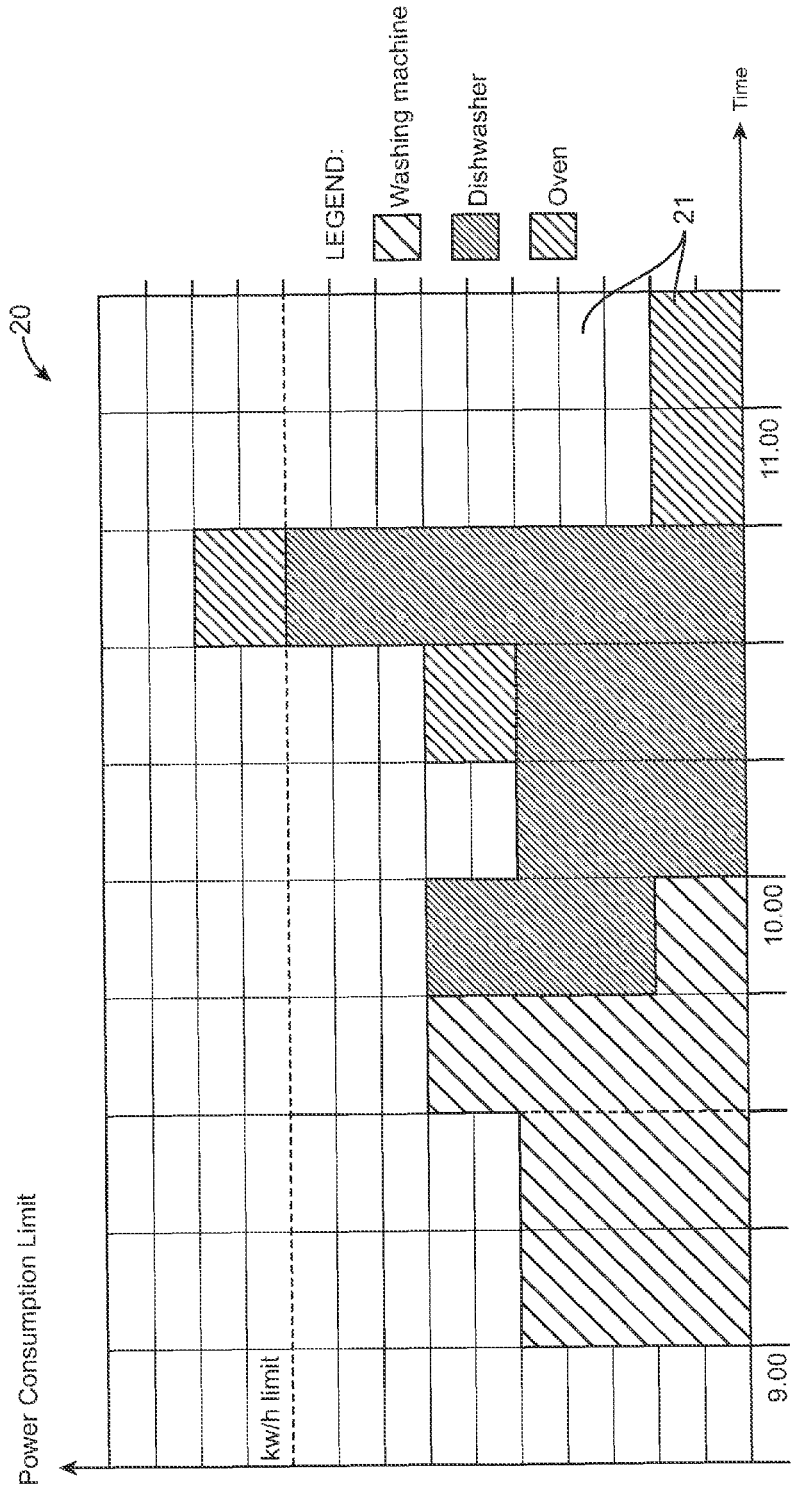
FIG. 2 shows an example interface for scheduling appliance operation cycles in time slots, according to an embodiment of the invention.

As shown in FIG. 2, in one implementation, the interface module 14 provides a graphical user interface 20 that provides information from a scheduling application function of the scheduler engine 13, whereby a user can easily schedule appliance cycles for multiple electrical appliances (e.g., washing machine, dishwasher, oven). In the example shown in FIG. 2, a washing machine is scheduled to run at 9:00 o'clock, and from the cycle information recorded in the repository it is known that the cycle will last for 60 minutes with a peak consumption beginning after 30 minutes and then trailing off to a lower consumption towards the end of the cycle. At 9:45 a dishwasher cycle is scheduled to begin, and it is known that it too will last for 60 minutes with consumption constant until the last 15 minutes where it increases. At 10:15 an oven cycle is scheduled to begin, with constant consumption for 60 minutes. Even with overlapping cycles, the consumption remains below the limit except for a 15 minute slot in which the dishwasher peak coincides with the oven. In this case, the user interface clearly indicates that a reschedule of one of the cycles is required to avoid exceeding the threshold.

To schedule the operation of an appliance 11 via the user interface (UI) 20, the user selects the appropriate appliance cycle (task) from a list that is appropriately filtered and ordered. The scheduling application then automatically adds the task in the best available time slot 21 based on the other scheduled appliance cycles (tasks) and on the allowed electricity consumption (e.g., kw/h) upper limit. The user can then move the appliance cycle to another time slot by dragging the bar related to the appliance cycle (in the example UI 20, identified by a unique shading or color for each appliance). In the example shown in FIG. 2, to resolve the problem of exceeding the threshold at 10:30, for example, the user may select one or more cycles for the oven and drag the selected cycles to the right until the sum of each column lies below the threshold. In the example, the start of the oven cycle would need to be dragged to 10:45 until the sum of each column lies below the threshold.

The repository 15 may use preloaded information from domestic appliance manufacturers as a predefined set of appliance cycles. Alternatively, users can also create their own appliance cycles by providing related information, wherein the scheduling application discovers the consumption information during the first run of the appliance cycle. The application cycle in the repository 15 may be refined during subsequent runs to filter out noise and improve accuracy of the appliance cycle for each appliance.

Figure 3:
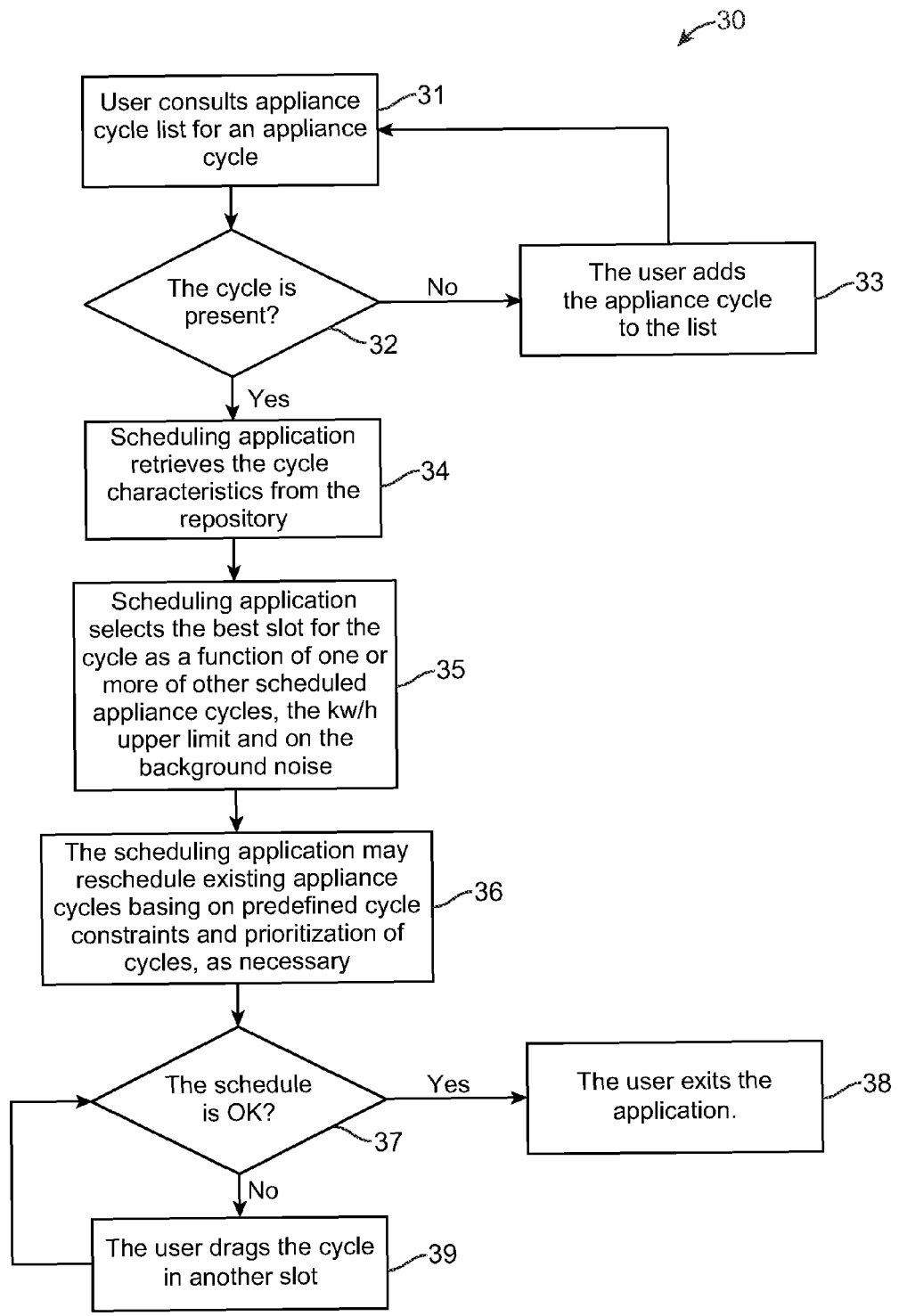
FIG. 3 shows a process for defining, scheduling and modifying an appliance cycle, according to an embodiment of the invention.

FIG. 3 shows a flowchart of a process 30 to define, schedule and modify an appliance cycle, using the system 12. When a new appliance cycle is added to the schedule, it may cause the consumption limit to be exceeded, whereby the cycles are rescheduled to remove the risk. This is performed according to predefined schedule constraints and prioritization of cycles. The user can override the reschedule by dragging the cycle on the interface.

In processing block 31, user consults a list of appliance cycles (e.g., from repository 15) for a desired appliance cycle. In processing block 32, it is determined if the appliance cycle is in the list. If not, the process proceeds to block 33, otherwise the process proceeds to block 34. In process block 33, the user adds the appliance cycle to the list, and the process proceeds back to block 31. In process block 34, the scheduling application retrieves the cycle characteristics from the repository 15. In process block 35, the scheduling application selects the best time slot for the appliance cycle, as a function of one or more of: other scheduled appliance cycles, the kw/h upper limit and on the background noise. In process block 36, the scheduling application may reschedule existing appliance cycles based on predefined cycle constraints and prioritization of cycles, as necessary. In process block 37, the scheduling application determines a projected power consumption level based on the current schedule, and it is determined if the schedule meets the upper limit electrical consumption limits for the residence. If the power consumption level based on the current schedule meets the upper limit, the process proceeds to process block 38, otherwise the process proceeds to process block 39. In process block 38, the user may choose to exit the scheduling application. In process block 39, the user may drag the processing cycle in another slot, and the process then proceeds back to process block 37.

In any time-slot, the total projected consumption level is the sum of the predicted consumption levels of each of the appliances scheduled to be active in that time-slot (respecting their cycle pattern) plus the background consumption "noise" predicted according to calendar patterns (based on historical observations). If the projected consumption level, so calculated, exceeds the threshold value (hard limit imposed by the utility company contract) then an action must be taken.

Historical usage patterns are utilized by the system 12 to proactively plan and schedule the use cycles of appliances. The system provides automatic rescheduling based on power consumption projections. The system proactively schedules appliance activity to ensure that the maximum power consumption limit is not exceeded. Power consumption projections are based on at least the historical power consumption observations, and the system recognizes power consumption patterns which are then applied to future projections (e.g., power usage on weekends is different from weekdays, and so on). The user need not be directly involved in the scheduling of the appliance usage (except to optionally override the system and ask for a reschedule). This proactive scheduling is predictable and repeatable. The user can be reasonably sure that the schedule will be respected (and therefore that, for example, the dishes will be washed and ready before the next time they are needed) using such predictable scheduling. The schedule is readily viewable at all times and the user can override it when desired (e.g., generating a new schedule based on the user priorities). The system allows predicting future usage patterns based on a historical usage pattern, therefore generating a schedule that stands a good chance of being maintained (remain unchanged). An example implementation is described in relation to the process in FIG. 4.

Figure 4:
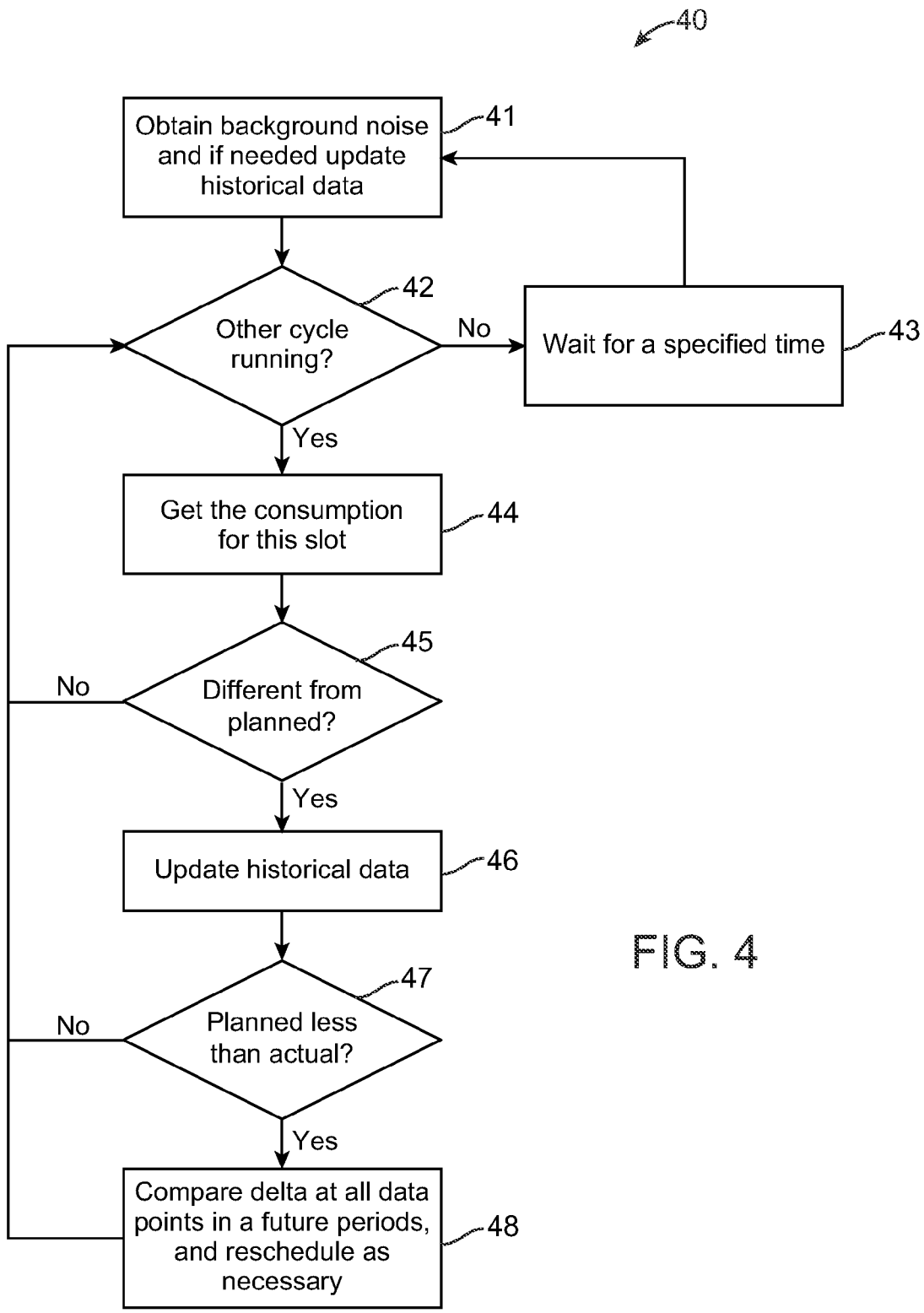
FIG. 4 shows a process for monitoring electrical power consumption by the scheduled appliances, according to an embodiment of the invention.

FIG. 4 shows a flowchart of a process 40 for monitoring electrical power consumption by the scheduled appliances, using the system 12. The process 40 is performed for each scheduled appliance based on the scheduled time slots. The description below relates to an instance of the process 40 for a scheduled appliance cycle (comprising one or more scheduled time slots). In process block 41, background noise information is obtained and if needed updates historical data. The scheduling application handles background noise due to low voltage and ad-hoc power usage (e.g., light bulbs). This noise is maintained as a background appliance cycle, and is based on historical patterns taking into account time-of-day, day-of-week, etc.

Background noise is obtained by observing power consumption constantly. If there are no scheduled cycles running, then the background noise is simply the total power consumption at that point in time (due to unscheduled activities like fridge, light bulbs, radio, etc.). If there are scheduled cycles active, then the background noise is the total actual consumption minus the predicted consumption for the scheduled cycles at that point-in-time. The historical data is used to ensure that the total consumption never exceeds the threshold, but it is possible that on occasion the background noise can exceed the predicted value based on historical observations (e.g., a birthday party that has loud music and more lighting that is typically employed). In this case, calculation of the total overall consumption in the plan is redone to ensure that this extra unplanned consumption does not push the total consumption over the threshold. If it is calculated that the extra consumption will at some future time, push the overall consumption over the threshold, then one or more of the scheduled cycles will be rescheduled to avoid this from happening. In general, historical data is updated according to a statistical calendar-based observation of power consumption.

In process block 42, it is determined if another appliance cycle running with the current appliance cycle. If not, the process proceeds to block 43, otherwise the process proceeds to block 44. In process block 43, the process enters a specified wait time period (e.g., one or more appliance time slots), then proceeds back to block 41. Since there is no other appliance cycle in the current time slot with the current appliance cycle (i.e., no more than one appliance is operating in the current time slot), after a delay the process gain checks for concurrency, which then necessitates determining if total power consumption of the appliance cycles meet power consumption limits (i.e., planned limits). In process block 44, the actual power consumption level by all appliance cycles in the current time slot is determined. In process block 45, it is determined if the actual power consumption level is different from the planned limit. If not, the process proceeds back to block 42, otherwise, the process proceeds to block 46. In process block 46, the historical power consumption levels are updated in the repository 15. In process block 47, it is determined if the planned consumption limit is less than the actual consumption. If not, the process proceeds back to block 42, otherwise the process proceeds to block 48.

In process block 48, the difference between planned and actual consumption (i.e., delta) at multiple data points (time slots) in a future period are compared, and rescheduling is performed as necessary. Proceed back to block 42. Specifically, in process block 48, just as the background noise cycle is used to plan the schedule, the current consumption is tracked, and when it differs from the planned consumption then the system evaluates whether a reschedule is required. If the actual consumption in a time slot exceeds the planned consumption, then the delta is compared to the difference between the planned consumption and the upper limit at all data points in a future period. If there is a possibility of exceeding the threshold then a reschedule is performed to reduce (eliminate) the risk. If, on the other hand, the current collective consumption is lower than the planned consumption, then future appliance cycles can be rescheduled to run them earlier. The multiple appliances 11 interconnected to the system 12 (e.g., via a network) for providing consumption information thereto and receiving operation cycle schedules.

In one example, if predicted power consumption at a future point is 20% of the threshold due to background consumption plus 70% of the threshold due to scheduled cycles (i.e., 90% of threshold in total), then the situation looks to be under control. If however, the actual background consumption is observed to be 40% of the threshold due to some deviation from the normal pattern, then this deviation is applied to near-future time-slots to assess the risk of exceeding the threshold. In this example, 40%+70%=110% and so a rescheduling of one of the scheduled cycles would be required to avoid the risk of exceeding the threshold.

Figure 5:
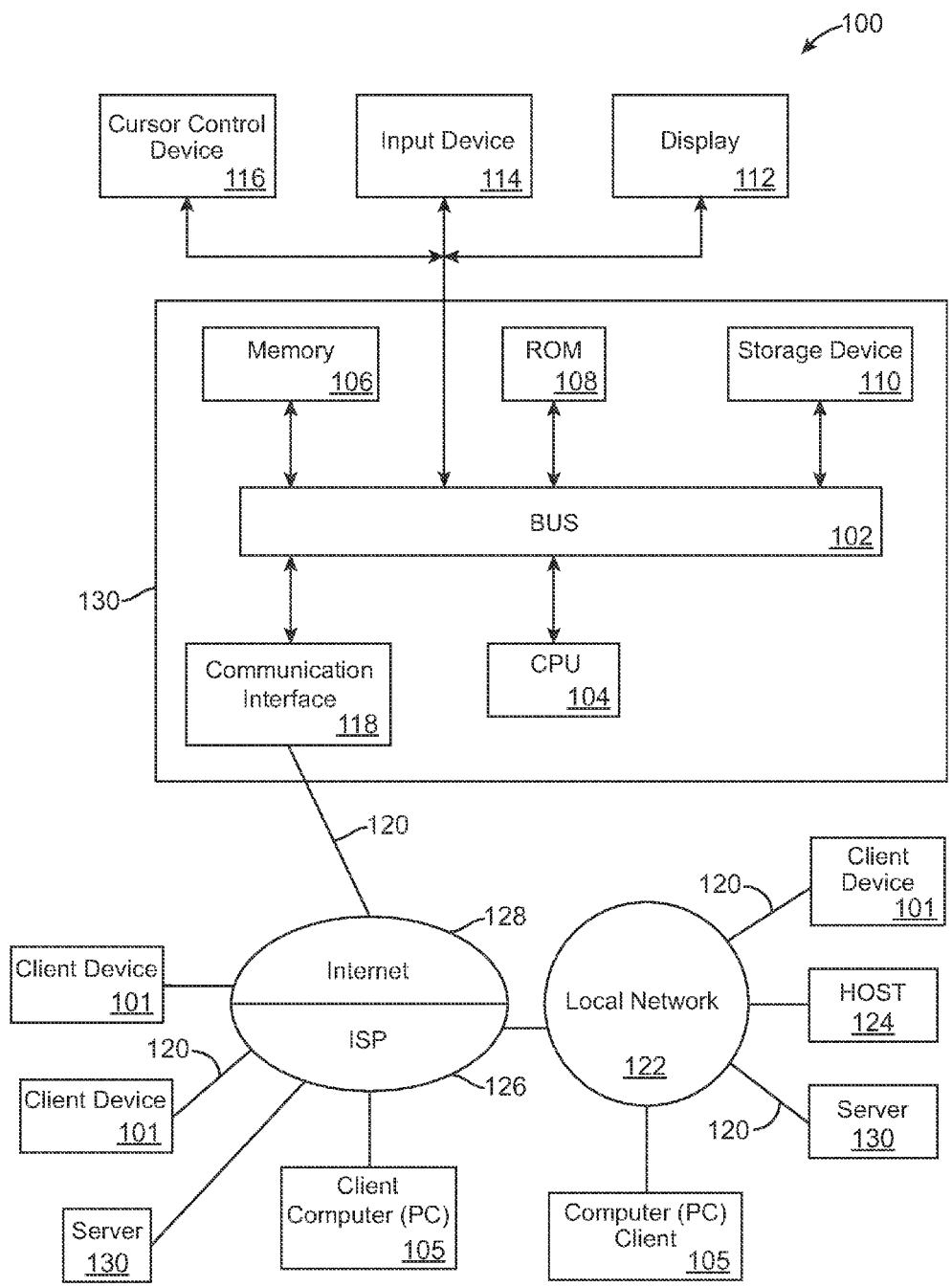
FIG. 5 shows a functional block diagram of an example computing system in which the invention is implemented.

FIG. 5 shows a block diagram of an example architecture of an embodiment of a system 100 configured as above, according to an embodiment of the invention. The system includes one or more client devices 101 connected to one or more server computing systems 130. A server 130 includes a bus or other communication mechanism for communicating information, and a processor (CPU) 104 coupled with the bus 102 for processing information. The server 130 also includes a main memory 106, such as a random access memory (RAM) or other dynamic storage device, coupled to the bus 102 for storing information and instructions to be executed by the processor 104. The main memory 106 also may be used for storing temporary variables or other intermediate information during execution or instructions to be executed by the processor 104. The server computer system further includes a read only memory (ROM) 108 or other static storage device coupled to the bus 102 for storing static information and instructions for the processor 104. A storage device 110, such as a magnetic disk or optical disk, is provided and coupled to the bus 102 for storing information and instructions. The bus 102 may contain, for example, thirty-two address lines for addressing video memory or main memory 106. The bus 102 can also include, for example, a 32-bit data bus for transferring data between and among the components, such as the CPU 104, the main memory 106, video memory and the storage 110. Alternatively, multiplex data/address lines may be used instead of separate data and address lines.

The server 130 may be coupled via the bus 102 to a display 112 for displaying information to a computer user. An input device 114, including alphanumeric and other keys, is coupled to the bus 102 for communicating information and command selections to the processor 104. Another type or user input device comprises cursor control 116, such as a mouse, a trackball, or cursor direction keys for communicating direction information and command selections to the processor 104 and for controlling cursor movement on the display 112.

According to one embodiment of the invention, the functions of the system 10 (FIG. 1) are performed by the server 130 in response to the processor 104 executing one or more sequences of one or more instructions contained in the main memory 106. Such instructions may be read into the main memory 106 from another computer-readable medium, such as the storage device 110. Execution of the sequences of instructions contained in the main memory 106 causes the processor 104 to perform the process steps described herein. One or more processors in a multi-processing arrangement may also be employed to execute the sequences of instructions contained in the main memory 106. In alternative embodiments, hard-wired circuitry may be used in place of or in combination with software instructions to implement the invention. Thus, embodiments of the invention are not limited to any specific combination of hardware circuitry and software.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network, that allow a computer to read such computer readable information. Computer programs (also called computer control logic) are stored in main memory and/or secondary memory. Computer programs may also be received via a communications interface. Such computer programs, when executed, enable the computer system to perform the features of the present invention as discussed herein. In particular, the computer programs, when executed, enable the processor multi-core processor to perform the features of the computer system. Accordingly, such computer programs represent controllers of the computer system.

Generally, the term "computer-readable medium" as used herein refers to any medium that participated in providing instructions to the processor 104 for execution. Such a medium may take many forms, including but not limited to, non-volatile media, volatile media, and transmission media. Non-volatile media includes, for example, optical or magnetic disks, such as the storage device 110. Volatile media includes dynamic memory, such as the main memory 106. Transmission media includes coaxial cables, copper wire and fiber optics, including the wires that comprise the bus 102. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to the processor 104 for execution. For example, the instructions may initially be carried on a magnetic disk of a remote computer. The remote computer can load the instructions into its dynamic memory and send the instructions over a telephone line using a modem. A modem local to the server 130 can receive the data on the telephone line and use an infrared transmitter to convert the data to an infrared signal. An infrared detector coupled to the bus 102 can receive the data carried in the infrared signal and place the data on the bus 102. The bus 102 carries the data to the main memory 106, from which the processor 104 retrieves and executes the instructions. The instructions received from the main memory 106 may optionally be stored on the storage device 110 either before or after execution by the processor 104.

The server 130 also includes a communication interface 118 coupled to the bus 102. The communication interface 118 provides a two-way data communication coupling to a network link 120 that is connected to the world wide packet data communication network now commonly referred to as the Internet 128. The Internet 128 uses electrical, electromagnetic or optical signals that carry digital data streams. The signals through the various networks and the signals on the network link 120 and through the communication interface 118, which carry the digital data to and from the server 130, are exemplary forms or carrier waves transporting the information.

In another embodiment of the server 130, interface 118 is connected to a network 122 via a communication link 120. For example, the communication interface 118 may be an integrated services digital network (ISDN) card or a modem to provide a data communication connection to a corresponding type of telephone line, which can comprise part of the network link 120. As another example, the communication interface 118 may be a local area network (LAN) card to provide a data communication connection to a compatible LAN. Wireless links may also be implemented. In any such implementation, the communication interface 118 sends and receives electrical electromagnetic or optical signals that carry digital data streams representing various types of information.

The network link 120 typically provides data communication through one or more networks to other data devices. For example, the network link 120 may provide a connection through the local network 122 to a host computer 124 or to data equipment operated by an Internet Service Provider (ISP) 126. The ISP 126 in turn provides data communication services through the Internet 128. The local network 122 and the Internet 128 both use electrical, electromagnetic or optical signals that carry digital data streams. The signals through the various networks and the signals on the network link 120 and through the communication interface 118, which carry the digital data to and from the server 130, are exemplary forms or carrier waves transporting the information.

The server 130 can send/receive messages and data, including e-mail, program code, through the network, the network link 120 and the communication interface 118. Further, the communication interface 118 can comprise a USB/Tuner and the network link 120 may be an antenna or cable for connecting the server 130 to a cable provider, satellite provider or other terrestrial transmission system for receiving messages, data and program code from another source.

The example versions of the invention described herein are implemented as logical operations in a distributed processing system such as the system 100 including the servers 130. The logical operations of the present invention can be implemented as a sequence of steps executing in the server 130, and as interconnected machine modules within the system 100. The implementation is a matter of choice and can depend on performance of the system 100 implementing the invention. As such, the logical operations constituting said example versions of the invention are referred to for e.g. as operations, steps or modules.

Similar to a server 130 described above, a client device 101 can include a processor, memory, storage device, display, input device and communication interface (e.g., e-mail interface) for connecting the client device to the Internet 128, the ISP 126, or LAN 122, for communication with the servers 130.

The system 100 can further include computers (e.g., personal computers, computing nodes) 105 operating the same manner as client devices 101, wherein a user can utilize one or more computers 105 to manage data in the server 130.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A method of managing power consumption by electrical appliances, comprising:
   obtaining power consumption information for a use cycle of each of multiple appliances;
   automatically scheduling a time slot for a future planned operation cycle of a selected appliance as a function of power consumption by appliance cycles scheduled in that time slot, such that an upper limit of power consumption is not exceeded by collective predicted power consumption for scheduled appliance cycles in the time slot;
   providing a user interface for receiving from a user an appliance selection and preferred operation time slot for the selected appliance; and
   automatically rescheduling an appliance cycle to another scheduled time slot as a function of power consumption by future planned appliance cycles scheduled in the user preferred time slot based on determining a difference between planned consumption and an upper power consumption limit such that the upper power consumption limit is determined to not exceed the collective predicted power consumption for scheduled appliance cycles in the user preferred time slot, wherein a risk of exceeding the upper power consumption limit is reduced.

2. The method of claim 1, wherein automatically scheduling a time slot for a future planned operation cycle of a selected appliance further includes automatically scheduling a time slot for a future planned operation cycle of the selected appliance as a function of:
   the collective predicted power consumption comprising: predicted power consumption during an operation cycle of said selected appliance cycle, predicted power consumption during an operation cycle of each of other appliances scheduled for operation during that time slot, and predicted background power consumption,
   such that the upper power consumption limit is not exceeded by the collective predicted power consumption in the time slot.

3. The method of claim 1, wherein obtaining power consumption information includes receiving power consumption information for a use cycle of each of multiple appliances from historical power consumption usage patterns.

4. The method of claim 1, wherein automatically scheduling a time slot for a future planned operation cycle of a selected appliance further includes automatically scheduling a time slot for an operation cycle of a selected appliance as a function of: the predicted power consumption by appliance cycles scheduled in that time slot, and historical power consumption patterns of said appliances,
such that the upper power consumption limit is not exceeded by the collective predicted power consumption for scheduled appliance cycles in the time slot.

5. The method of claim 1 further including:
   determining power consumption projections based on historical power consumption patterns of the appliances; and
   automatically rescheduling appliance cycles for future planned usage based on tracked actual power consumption levels and power consumption projections for the appliances, such that the upper power consumption limit is not exceeded by the collective predicted power consumption for scheduled appliance cycles in each time slot.

6. The method of claim 1 further including:
   if an appliance cycle is imposed for a future planned time slot, then automatically rescheduling other appliance cycles in that time slot according to predefined schedule constraints and prioritization of appliance cycles, wherein rescheduling comprises moving other appliance cycles to other future planned time slots.

7. The method of claim 1, wherein automatically rescheduling appliance cycles further comprises:
   moving future planned appliance cycles scheduled in the user preferred time slot to another time slot, such that the upper limit of power consumption is not exceeded by the collective predicted power consumption for scheduled appliance cycles in said another time slot.

8. The method of claim 7, wherein automatically rescheduling appliance cycles further comprises:
   moving future planned appliance cycles scheduled in the user preferred time slot to another time slot based on one or more of: predefined cycle constraints, prioritization of cycles, power consumption projections, and historical power consumption observations.

9. The method of claim 1, wherein obtaining power consumption information comprises obtaining power consumption information for a predicted use cycle of each of multiple appliances from one or more of: an appliance manufacturer, and recorded historical actual power consumption data.

10. An apparatus for managing power consumption by electrical appliances, comprising:
    an interface configured for obtaining power consumption information for a use cycle of a each of multiple appliances; and
    a scheduler configured for automatically scheduling a time slot for a future planned operation cycle of a selected appliance as a function of predicted power consumption by appliance cycles scheduled in that time slot, such that an upper limit of power consumption is not exceeded by a collective predicted power consumption for scheduled appliance cycles in the time slot, the scheduler further configured for automatically rescheduling an appliance cycle by moving the appliance cycle to another scheduled time slot for maintaining power consumption below the upper limit of power consumption for the particular time slot based on a time slot selection and by determining a difference between planned consumption and the user limit of power consumption.

11. The apparatus of claim 10, wherein the scheduler is further configured for automatically scheduling a time slot for a future planned operation cycle of the selected appliance as a function of:
    the collective predicted power consumption comprising: predicted power consumption during an operation cycle of said selected appliance cycle, predicted power consumption during an operation cycle of each of other appliances scheduled for operation during that time slot, and predicted background power consumption, such that the upper limit of power consumption is not exceeded by the collective predicted power consumption for scheduled appliance cycles in the time slot.

12. The apparatus of claim 10, wherein the interface is further configured for receiving power consumption information for a use cycle of each of multiple appliances from historical power consumption usage patterns.

13. The apparatus of claim 10, wherein the scheduler is further configured for automatically scheduling a time slot for a future planned operation cycle of a selected appliance as a function of:

the predicted power consumption by appliance cycles scheduled in that time slot, and historical power consumption patterns of said appliances, such that the upper limit of power consumption is not exceeded by the collective predicted power consumption for scheduled appliance cycles in the time slot.

14. The apparatus of claim 10, wherein the scheduler is further configured for:

determining power consumption projections based on historical power consumption patterns of the appliances; and automatically rescheduling appliance cycles for future planned usage based on tracked actual power consumption levels and power consumption projections for the appliances, such that the upper limit of power consumption is not exceeded by the collective predicted power consumption for scheduled appliance cycles in each time slot.

15. The apparatus of claim 10, wherein:

the interface is further configured for providing a user interface for receiving from a user an appliance selection and preferred operation time slot for the selected appliance; and the scheduler is further configured for automatically rescheduling future planned appliance cycles as a function of predicted power consumption by appliance cycles scheduled in that time slot, such that an upper limit of power consumption is not exceeded by the collective predicted power consumption for scheduled appliance cycles in the time slot.

16. The apparatus of claim 10, wherein the scheduler is further configured such that if an appliance cycle is imposed for a future planned time slot, then the scheduler automatically reschedules other appliance cycles in that time slot according to predefined schedule constraints and prioritization of appliance cycles, wherein rescheduling comprises moving other appliance cycles to other future planned time slots.

17. The apparatus of claim 10, wherein automatically rescheduling appliance cycles comprises:

moving future planned appliance cycles from the particular time slot to another time slot, such that the upper limit of power consumption is not exceeded by the collective power consumption for future planned scheduled appliance cycles in said another time slot.

18. The apparatus of claim 17, wherein automatically rescheduling appliance cycles further comprises:

moving future planned appliance cycles scheduled in the particular time slot to another available time slot based on one or more of: predefined cycle constraints, prioritization of cycles, power consumption projections, and historical power consumption observations.

19. A system for managing power consumption by multiple electrical appliances, comprising:

an interface configured for obtaining power consumption information for a use cycle of each of multiple appliances;

a repository configured for maintaining historical appliance cycle information; and a scheduler configured for automatically scheduling a time slot for a future planned operation cycle of a selected appliance as a function of power consumption by appliance cycles scheduled in that time slot, such that an upper limit of power consumption is not exceeded by a collective predicted power consumption for scheduled appliance cycles in the time slot, the scheduler further configured for automatically rescheduling an appliance cycle to another scheduled time slot based on determining a difference between planned consumption and the upper limit of power consumption in a particular time slot to prevent power consumption from exceeding the upper limit of power consumption for the particular time slot based on a time slot selection.

20. The system of claim 19 further including multiple appliances interconnected to the scheduler for providing consumption information thereto and receiving operation cycle schedules, wherein the scheduler is further configured for automatically scheduling a time slot for an operation cycle of the selected appliance as a function of:

the collective predicted consumption comprising: predicted power consumption during an operation cycle of said selected appliance cycle, predicted power consumption during an operation cycle of each of other appliances scheduled for operation during that time slot, and historical power consumption usage patterns, such that the upper limit of power consumption is not exceeded by the collective predicted power consumption for scheduled appliance cycles in the time slot.

21. The system of claim 20, wherein the scheduler is further configured for automatically scheduling a time slot for an operation cycle of a selected appliance as a function of:

the predicted power consumption by appliance cycles scheduled in that time slot, and historical power consumption patterns of said appliances, such that the upper limit of power consumption is not exceeded by the collective predicted power consumption for scheduled appliance cycles in the time slot.

22. The system of claim 20, wherein the scheduler is further configured for:

determining power consumption projections based on historical power consumption patterns of the appliances; and automatically rescheduling appliance cycles for future planned usage based on tracked actual power consumption levels and power consumption projections for the appliances, such that the upper limit of power consumption is not exceeded by the collective predicted power consumption for scheduled appliance cycles in each time slot.

23. The system of claim 20, wherein:

the interface is further configured for providing a user interface for receiving from a user an appliance selection and preferred operation time slot for the selected appliance; and the scheduler is further configured for automatically rescheduling future planned appliance cycles as a function of power consumption by appliance cycles scheduled in that time slot, such that the upper limit of power consumption is not exceeded by the collective predicted power consumption for scheduled appliance cycles in the time slot.

24. The system of claim 20, wherein the scheduler is further configured such that if an appliance cycle is imposed for a future planned time slot, then the scheduler automatically reschedules other appliance cycles in that time slot according to predefined schedule constraints and prioritization of appliance cycles, wherein rescheduling comprises moving other appliance cycles to other future planned time slots.

25. The system of claim 19, wherein automatically rescheduling appliance cycles comprises:
    moving future planned appliance cycles from the particular time slot to another time slot, such that the upper limit of power consumption is not exceeded by the collective predicted power consumption for scheduled appliance cycles in said another time slot.

26. The system of claim 25, wherein automatically rescheduling appliance cycles further comprises:
    moving future planned appliance cycles scheduled in the particular time slot to another time slot for future planned appliance cycles based on one or more of: predefined cycle constraints, prioritization of cycles, power consumption projections, and historical power consumption observations.

* * * * *